March 31, 1964
W. S. BLUME, JR
3,127,461
METHOD OF PRODUCING CURVED RADIALLY ALIGNED MATRIX BONDED FINE PARTICLE PERMANENT MAGNETS
Filed July 10, 1961
2 Sheets-Sheet 1
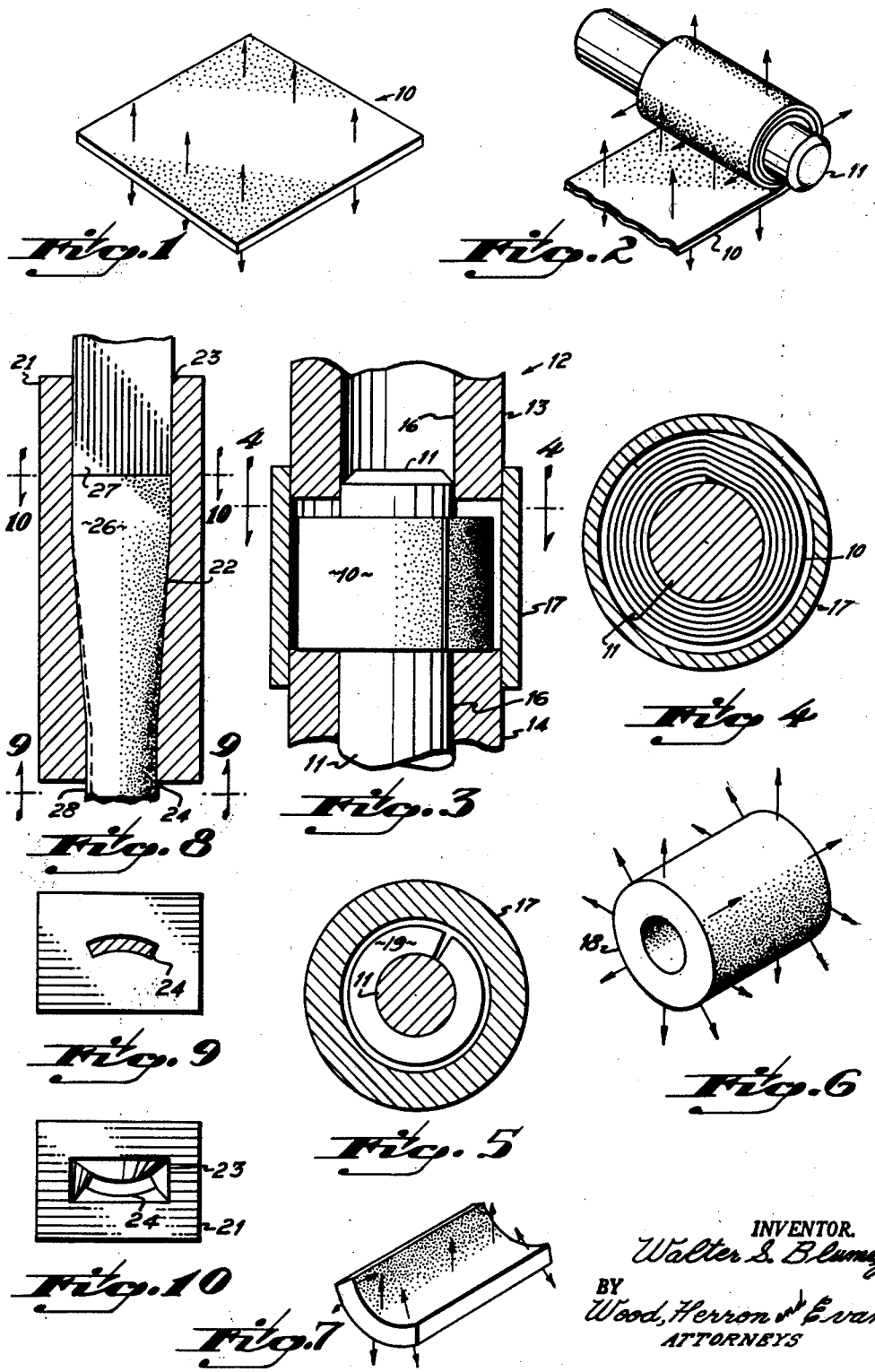
INVENTOR.
Walter S. Blume, Jr.
BY
Wood, Herron & Evans
ATTORNEYS March 31, 1964 W. S. BLUME, JR 3,127,461
METHOD OF PRODUCING CURVED RADIALLY ALIGNED MATRIX
BONDED FINE PARTICLE PERMANENT MAGNETS
Filed July 10, 1961 2 Sheets-Sheet 2
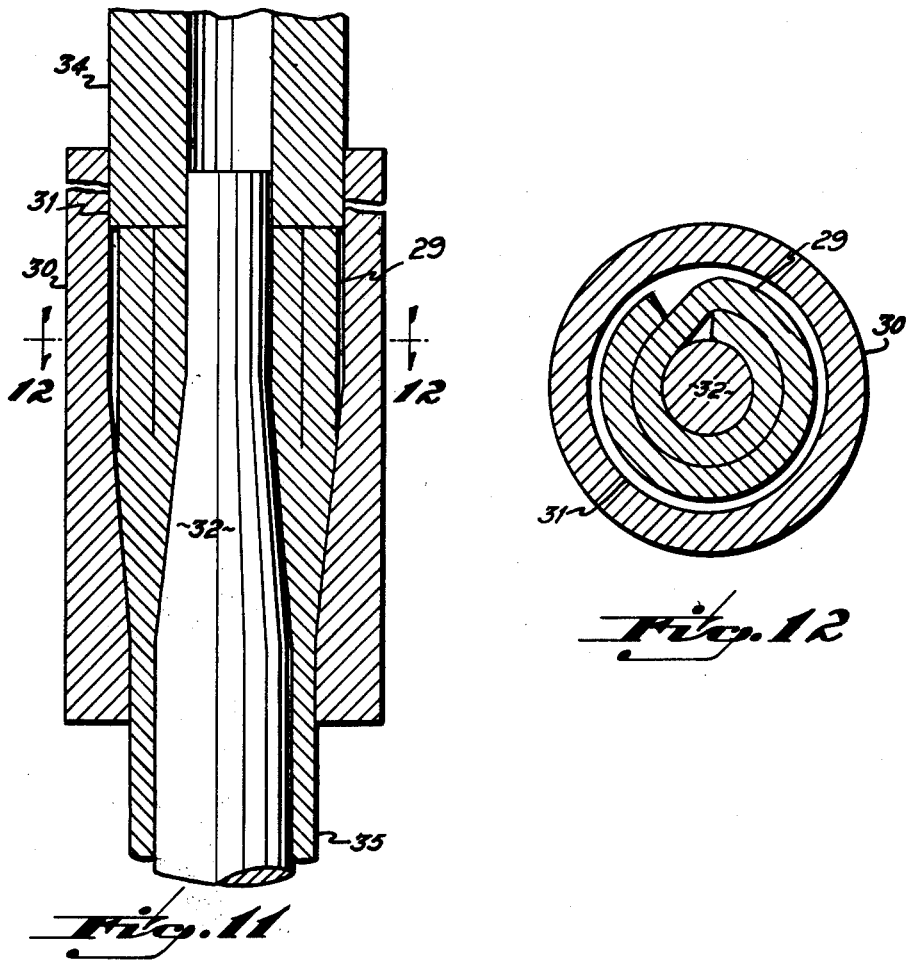
INVENTOR.
Walter S. Blume, Jr.
BY
Wood, Herron & Evans
ATTORNEYS 3,127,461
METHOD OF PRODUCING CURVED RADIALLY ALIGNED MATRIX BONDED FINE PARTICLE PERMANENT MAGNETS
Walter S. Blume, Jr., 1371 Colonial Drive, Cincinnati 38, Ohio
Filed July 10, 1961, Ser. No. 122,834
7 Claims. (Cl. 264—325)

This invention relates to permanent magnets and permanent magnet materials of the type comprising fine anisotropic particles of a permanent magnet substance which are bonded together in coherent form by a rubber or plastic matrix and which are aligned in the matrix so that their preferred directions of magnetization are parallel. More particularly, the invention relates to a process for producing rings, ring segments and other forms having a curved surface which display magnetic alignment in radial directions, that is, in directions normal or perpendicular to the curved surface.

Certain potentially magnetic materials or substances, if ground or reduced to ultrafine particles, display the property of magnetic anisotropy, such that each particle is inherently more easily or strongly magnetizable in one certain direction, with respect to its axes, than in any other direction. This unique direction is referred to as the preferred magnetic direction or simply as the preferred axis. Normally, a collection of such particles is heterogeneous and the preferred direction of the individual particles are randomly directed with respect to each other, so that the collection as a whole displays no preferred direction. In my co-pending patent application Serial No. 748,705, filed July 15, 1958, and entitled, "Mechanical Orientation of Magnetically Anisotropic Particles," now U.S. Patent No. 2,999,275, issued September 12, 1961, there is disclosed a process for incorporating such ultrafine anisotropic particles into a matrix and bringing the preferred directions of magnetization of the individual particles into a state of substantial parallelness in the matrix, so that the resultant matrix bonded material itself displays a preferred direction of magnetization.

Magnets produced from materials of this aligned fine particle matrix bonded type are used in a great many ways, in place of conventional "bulk," or non-particulate, permanent magnets. Moreover, on account of unique properties which they possess which bulk magnets do not, they are often suitable where certain types of bulk magnets are unsuitable. They are not as hard and brittle as most high quality bulk magnet materials. They are cuttable and can be shaped by conventional forming techniques, for example, by punching, sawing, drilling, and edge cutting, whereas most high quality bulk magnets can be cut only by grinding. Their magnetic qualities and cost render them highly competitive with bulk magnets.

In the past, aligned matrix bonded fine particle magnet material has been produced only in forms or shapes which are generally flat, such as sheets, strips and slabs. As disclosed in my previously identified patent application Serial No. 748,705, in the production of such material, a bulk permanent magnet material, for example, barium ferrite, is prepared in the form of anisotropic fine particles, preferably of domain size of the order of ½ to 10 microns. Thus divided, the particles are dispersed in an elastomeric matrix by adding the particles to uncured rubber, for example, as it is being worked or masticated on a conventional rubber mill or banbury mill. The weight ratio of particles to matrix material, which is known as the loading factor, is usually relatively high, so that the magnetic material will be "diluted" as little as possible by the binder and will impart optimum magnetic qualities to the product. In practice, the mixture so formed may comprise 90% or more by weight of magnetic material.

As the magnetic particles and binder are intimately mixed together, the rubber apparently flows into the interstices of the particles and fills the interparticle voids, so that the resulting mass, in spite of the large fraction of magnetic particles in it, is physically coherent.

The direction of alignment of the material depends on the nature of the anisotropy of the particles. Where the magnetic material is a ferrite material or manganese-bismuth, for example, the material displays a direction of alignment which is substantially normal to its surface, and it is with perpendicularly aligned material that the present invention is primarily concerned. (With other magnet materials, for example, elongated single domain iron particles, the direction of alignment will be in the plane of the sheet.)

The sheet, strip or slab is then subjected to elevated temperatures and pressures whereby it is cured, set or hardened. Such sheet material is produced under the name "Plastiform" and is available from Leyman Corporation, Magnetics Division, 5178 Crookshank Road, Cincinnati 38, Ohio.

The present invention is directed to the manufacture of magnets or, more specifically, magnetizable material, in the shape of rings, ring segments and other curved or arcuate forms from essentially flat matrix bonded fine particle magnet materials, such that the curved forms display alignment in the radial direction. Radially aligned ring and ring segments magnets are highly suitable for use in electric motors, for example, as the field magnet or as the armature magnet. Rubber bonded fine particle magnets which are radially aligned are of particular utility for this purpose because they present the combination of good magnetic qualities together with mechanical durability and cutability.

Although such aligned materials have been available in flat shapes, curved radially aligned magnets of the bonded fine particle type have not heretofore been available. In theory it is possible to bend flat materials into curved shapes, but in actual practice such flat material cannot easily be formed into curved shapes on account of its poor pliability, especially in thick forms.

Because the proportion of magnetic particles in rubber bonded sheet material is normally quite high, so that the magnetic material will be "diluted" as little as possible by the binder, flat matrix bonded materials do not and indeed could hardly be expected to display properties of pliability and coherency comparable to those of the unfilled rubber matrix alone. Indeed, in a sense it is odd that materials which are so highly loaded are at all pliable or coherent since they are mostly made up of fine, hard, brittle particles. They are sufficiently coherent in fact to withstand the stresses incidental to their use and to conventional forming techniques. However, they are relatively unpliable and are subject to checking or cracking if deformed or bent beyond relatively narrow limits; although they are not nearly so brittle as bulk magnets, they cannot be bent into substantially curved forms without tending to check, crack or break, especially where their thickness is great in relation to the radius of curvature. It is for this reason it has not heretofore been possible to produce commercially acceptable curved magnets from such flat materials.

I have discovered a method whereby flat matrix bonded fine particle magnet materials may be formed into various curved shapes which are not cracked, split or broken and which are durable and coherent, and moreover, which display alignment in radial directions.

In accordance with a preferred embodiment of this process, a radially aligned ring is produced from flat normally aligned matrix bonded sheet material by wrapping the sheet material around a cylindrical mandrel which has a diameter equal to the inside diameter of the desired ring, placing the mandrel and material wrapped around it in a die cavity having a diameter equal to the outside diameter of the ring and which is slightly larger than the diameter of the wrapped sheet material, and exerting endwise pressure (i.e., pressure in the axial direction) on the material whereby the material is caused to flow both axially and radially in the die cavity and conform to the shape thereof. As an incident to this process, the material although initially cracked and perhaps broken, is reformed, and coheres to itself at its ends and is facially adjacent surfaces so that it becomes a solid, durable integral form. Most surprisingly, however, the radial alignment of the material is not significantly affected by the presumably disaligning endwise pressure to which it is subjected.

In another embodiment of my process, a curved, radially aligned annular ring, ring segment or other curved shape is produced from a sheet or slab of normally aligned matrix bonded fine particle material by extruding or forcing the material through a curved, tapered orifice whereby the thickness of the material is reduced and the material is caused to assume the desired curved shape, and is then cured or set in such shape.

The process may best be further explained in relation to the accompanying drawings, in which:

FIGURE 1 is a perspective view of a sheet of normally aligned fine particle matrix bonded permanent magnet sheet material;

FIGURE 2 is a perspective view of sheet material of the type shown in FIGURE 1 being wrapped in a spiral around a mandrel, preparatory to conversion into an integral, radially aligned ring in accordance with the invention;

FIGURE 3 is a vertical cross section through a die wherein spirally wrapped material of the type shown in FIGURE 2 is subjected to longitudinal or axial compression to integrate it into a unitary ring;

FIGURE 4 is a horizontal section taken on line 4—4 of FIGURE 3;

FIGURE 5 is a horizontal section similar to FIGURE 4, but shows instead a relatively thick slab of material of the general type illustrated in FIGURE 1 which has been bent into curved form around the mandrel;

FIGURE 6 is a perspective view showing an integral normally aligned ring produced in accordance with the process of this invention;

FIGURE 7 is a perspective view illustrating a curved radially aligned arc segment produced in accordance with another embodiment of the invention;

FIGURE 8 is a vertical cross-section through a curved, tapered extrusion die in which a slab of normally aligned fine particle matrix bonded permanent magnet material is being converted into an arc segment of the type shown in FIGURE 7;

FIGURE 9 is a horizontal cross-section taken on line 9—9 of FIGURE 8;

FIGURE 10 is a horizontal cross-section of the extrusion die taken on line 10—10 of FIGURE 8, in which the magnetic material is not shown;

FIGURE 11 is a vertical cross-section through an extrusion die having a tapered annular orifice, in which tubularly rolled normally aligned fine particle matrix bonded permanent magnet material is being converted into an integral hollow ring; and FIGURE 12 is a horizontal cross-section taken on line 12—12 of FIGURE 11.

Referring now to the drawings in more detail, in FIGURE 1 there is illustrated a sheet 10 of fine particle matrix bonded permanent magnet material, for example of the previously-referred to Plastiform type, which has a preferred direction of magnetization normal to its surface, as indicated by the arrows. It is to be understood that insofar as the present process is concerned, this starting material need not be, and preferably is not, magnetized prior to its conversion into a curved radially aligned form. In other words, while this sheet material is, of course, adapted to be magnetized in the direction of alignment, actual magnetization of the material is a step which is preferably carried out after the material has been converted into the desired curved form, and is not a part of the invention.

To produce a radially aligned ring from this sheet material, the sheet material 10, preferably before it has been cured, is wrapped spirally around a cylindrical mandrel 11, as shown in FIGURE 2. The width of the material, i.e., its dimension in axial direction when wrapped around the mandrel 11, should be slightly greater than the desired corresponding dimension of the ring, for reasons which will be explained subsequently. The diameter of the mandrel determines the inside diameter of the ring. The diameter of the material when wrapped around the mandrel should be slightly less than the desired outside diameter of the ring.

When thus wrapped around the mandrel 11, the material 10 will display alignment in the normal, or radial, direction, as will be understood from FIGURE 2. To be of commercial utility, however, this loosely wrapped material must be converted into a solid unitary ring without altering, or substantially altering, the radial alignment or orientation of the particles of magnetic material in the matrix in so doing.

To effect this conversion, the mandrel 11 with the sheet material 10 wrapped around it is placed in an assembly 12 equipped with dies of the type shown in FIGURE 3. Specifically, the mandrel 11 is placed between an upper compression sleeve 13 and a lower compression sleeve 14, each of which is provided with an internal bore 16 having a diameter approximately equal to the diameter of the mandrel 11. The upper and lower ends of the mandrel 11 are received in the bores 16 of the sleeves 13 and 14 respectively, so that the wrapped material 10 is disposed between the opposing faces of the sleeves. An annular die member 17 having an inside diameter equal to the desired outside diameter of the ring which is to be produced fits around the sleeves 13 and 14 so as to enclose the wrapped material 10. The wrapped material is thus confined in the cavity which is between the mandrel 11, die member 17, and the sleeves 13 and 14. As shown in FIGURE 4, the inside diameter of the die member 17 is preferably somewhat larger, e.g., 10%, than the diameter of the wrapped material, so that it readily fits around the material.

The wrapped material is integrated by applying force to move the two compression sleeves 13 and 14 relatively together, so that the material 10 is compressed between them. As this occurs, the mandrel 11, which is received in the bores 16 in the sleeves, serves to maintain the sleeves in axial alignment. Heat may be applied to soften the matrix or binder of the magnetic material, provided it is not sufficient to precure or damage the binder.

As the material 10 is compressed in the die cavity, it flows both axially and outwardly, and even transversely to a certain extent, so that it occupies the entire diminishing available space between the mandrel 10 and the inner wall of the member 17, and at the same time becomes integrated and unitarily coherent, even though it originally comprised a number of separate layers. In spite of its high loading with particles and the forces to which it is subjected, it does not crack during this process, and in fact, if it was originally cracked or broken, becomes reunited as it flows under the forces exerted upon it in the confined area. By way of example, but not limitation, a force of 2,000 to 20,000 pounds per square inch of cross sectional area is sufficient to integrate the ring, the exact pressure being dependent on the plasticity of the matrix and the quantity of heat which is applied if any.

Since the magnetic material is comprised of ultrafine particles, which as previously explained are oriented or arranged in alignment in the matrix, and since these particles seemingly would be rotated as the matrix in which they are embedded flows in response to the forces applied to it, it is considered surprising that, in fact, particle alignment is not substantially disturbed as the material is squeezed axially and becomes larger in diameter. So far as has been able to be determined, no disturbance of alignment takes place.

As an incident to the forming process, the outer surface of the material takes a smooth finish, conforming to the finish of the dies and collar, and sharp corners are formed on the ring. The laminae of the original wrapped turns effectively unite, and the various adjacent layers cohere strongly, forming for all practical purposes a continuous phase.

Upon release of pressure, the upper sleeve 13 is withdrawn and the ring 18 is removed or is ejected by the lower sleeve 14. The ring 18 has an appearance generally shown in FIGURE 6, and is aligned normally. The matrix is then cured or set in the appropriate manner, for example in accordance with the technique set forth in my previously identified patent application Serial No. 748,705. The ring can be converted into a normally oriented magnet by subjecting it to a radially directed magnetizing field, but as previously explained, such magnetization is not a part of the invention, and may ultimately be performed by the purchaser rather than by the manufacturer of the ring.

It will be appreciated that the technique I have invented is not limited to the production of rings of any particular size or curvature, nor indeed even to cylindrical rings, but may be equally well applied to the manufacture of other shapes and sizes.

It is not necessary to build the desired ring wall thickness by wrapping thin sheet material around the mandrel a number of times. One of the advantages of this technique is, in fact, that even a relatively heavy slab of fine particle matrix bonded material such as that designated by 19 in FIGURE 5 may be bent around the mandrel 11, so that its ends approximately meet, and then placed in the die member 17 and formed into a ring in accordance with the process as described. The compression forces applied cause the slab 19 to integrate or cohere at its ends, to form a ring, and obliterate or mend any cracks which may appear as the result of bending the thick slab 19 to a tight curvature. Disturbance of alignment in the fabrication of a ring from a thick slab is no more noticeable than where thin material is employed, however.

In accordance with a related embodiment of this technique, curved normally aligned rings, arc segments and other curved forms can be produced by forcing or extruding normally aligned sheet or slab material through a tapered, curved orifice in an extrusion die, to produce the curved material in greater lengths.

FIGURES 7–10 illustrate the production of an open curved form by this method. As shown in FIGURE 8, an extrusion die 21 is provided with an orifice 22 which is substantially rectangular at its upper end 23 and which gradually tapers to a curved opening 24 at its lower end. A flat slab 26 of normally aligned fine particle matrix bonded permanent magnet material is inserted in the rectangular opening 23 at the upper end of the die 21, and is forced downwardly through the orifice 24 at the lower end by a ram 27. The material 26 is reduced in thickness and becomes elongated as it is forced through the die. Heat may be applied to soften the matrix so that it is more readily extruded. If for example the matrix is uncured rubber, the extrusion process is expedited by the application of heat provided it does not reach curing temperature. The material issues from the orifice in curved, normally aligned arcuate form, as at 28, and may be cut off into lengths as desired. The extruded material is then cured or hardened to permanently set it in the curved shape. After final shaping and magnetization by subjection to a radially aligned magnetizing field, the oriented curved magnets can be used in electric motors or other installations, as previously explained.

The extrusion technique just described is not limited to the production of open-ended curved forms such as that shown in FIGURE 7, but is equally suited for the production of curved hollow forms such as the ring shown in FIGURE 6. The extrusion of such a form is illustrated in FIGURES 11 and 12. In this instance perpendicularly aligned flat sheet material 29 is wound into tubular form and is extruded through a die 30 which presents a tapering annular orifice 31 around an axial core member 32. The annular orifice 31 is relatively wide at the upper end of the die, but becomes smaller toward its lower end, so that the preformed tube of material 29 is reduced in wall thickness as it is forced through the die by a sleeve 34. The loosely formed tube of sheet material 29 which is inserted into the orifice 31 is cohered and integrated into a unitary ring or tube 35 as it is reduced in wall thickness, and is elongated as it is forced through the die. The integrated tubular magnetic material 35 which comes from the die is radially aligned.

While I have described and illustrated the preferred technique of practicing my invention, the invention is not limited to that method alone, but is susceptible of modifications and variations which fall within the scope of the following claims.

Having described my invention, what is claimed is:

1. A method of making a permanently magnetizable ring which displays radial magnetic alignment, said method comprising, bending normally flat perpendicularly oriented fine particle matrix bonded permanent magnet material into the approximate shape of said ring, disposing said material in an annular die cavity having inside and outside diameters equal to the diameter of said ring, and subjecting said material to endwise compression whereby said material is caused to flow and to conform to the shape of said cavity, said material being cohered to itself as an incident to said compression, the direction of alignment of said material being substantially unchanged by said endwise compression.

2. The method of claim 1 wherein said material is uncured prior to being formed into said ring, and wherein said ring is cured as a final step of said method.

3. The method of claim 1 wherein said matrix is rubber.

4. A method of making a permanently magnetizable ring which displays radial magnetic alignment, said method comprising, bending normally flat fine particle matrix bonded permanent magnet material into ring form around a mandrel, said permanent magnet material being of the type which displays magnetic alignment in the direction normal to its surface, said mandrel having a diameter equal to the diameter of said ring, disposing said material wrapped around said mandrel in a die cavity having a size conforming to the size of said ring, subjecting said material to endwise pressure whereby said material is compressed axially and is caused to flow and conform to the shape of said cavity, said material being integrated and cohered as an incident to said compression, and withdrawing said ring from said mandrel and die cavity.

5. A method of making a permanently magnetizable ring which displays radial magnetic alignment, said method comprising, winding normally flat perpendicularly oriented matrix bonded fine particle permanent magnet material into ring form, axially supporting said material on a mandrel having a diameter corresponding to the inside diameter of said ring, disposing said material between axially spaced compression sleeves, confining said material within a cylindrical surrounding member having an inside diameter slightly greater than the diameter of said material, and subjecting said material to axial compression between said sleeves while supported on said mandrel, whereby said material is decreased in axial dimension and increased in diameter to conform to the inside diameter of said surrounding member, and further whereby said material is cohered to itself in the form of an integral solid ring, withdrawing said ring, and curing said ring.

6. A method of making a permanently magnetizable ring which displays radial magnetic alignment, said method comprising, spirally winding normally flat fine particle matrix bonded permanent magnet material into the approximate shape of said ring, disposing said material in an annular die cavity having inside and outside diameters equal to the diameter of said ring, and subjecting said material to endwise compression to reduce the axial dimension of said material whereby said material is caused to flow to conform to the shape of said cavity, said material being cohered to itself as it conforms to the shape of said cavity, the direction of alignment of said material being substantially unchanged by said endwise compression.

7. A method of making a permanently magnetizable ring which displays radial magnetic alignment, said method comprising, bending a normally flat slab of perpendicularly aligned fine particle matrix bonded permanent magnet material into the approximate shape of said ring, disposing said material in an annular die cavity having inside and outside diameters equal to the diameter of said ring, and subjecting said material to endwise compression between annularly shaped sleeves whereby said material is caused to flow and to conform to the shape of said cavity, said material being cohered to itself at its ends as an incident to said compression, the direction of alignment of said material being substantially unchanged by said endwise compression.

References Cited in the file of this patent
UNITED STATES PATENTS

| | | |
|---|---|---|
| 1,669,644 | Andrews | May 15, 1928 |
| 1,669,665 | Karcher | May 15, 1928 |
| 2,064,773 | Vogt | Dec. 15, 1936 |
| 2,130,254 | Visman | Sept. 13, 1938 |
| 2,188,091 | Baermann | Jan. 23, 1940 |
| 2,241,441 | Bandur | May 13, 1941 |
| 2,903,329 | Weber | Sept. 8, 1959 |
| 2,999,275 | Blum | Sept. 12, 1961 |

FOREIGN PATENTS

| | | |
|---|---|---|
| 2,577,316 | Great Britain | May 14, 1946 |